United States Patent [19]

Brice

[11] Patent Number: 4,776,415

[45] Date of Patent: Oct. 11, 1988

[54] SAFETY CONTROL FOR BABY'S WALKER

[76] Inventor: Michael L. Brice, 413 Hamrick, Romeoville, Ill. 60441

[21] Appl. No.: 73,599

[22] Filed: Jul. 13, 1987

[51] Int. Cl.$^4$ .............................................. B60K 1/02
[52] U.S. Cl. ...................................... 180/11; 180/15; 180/16; 180/199; 180/167; 180/907; 280/43.23; 280/87.02 W; 280/767; 446/466
[58] Field of Search ................... 180/167, 166, 11, 15, 180/16, 209, 199, 907, 8.2, 9.32; 280/87.02 W, 767, 43.23; 446/456, 462, 466

[56] References Cited

U.S. PATENT DOCUMENTS

| | | | |
|---|---|---|---|
| 2,308,626 | 1/1943 | Reinholz | 280/87.02 W |
| 3,340,941 | 9/1967 | Neu | 280/87.02 W |
| 3,872,945 | 3/1975 | Hickman et al. | 180/907 |
| 4,224,762 | 9/1980 | McCaslin | 446/456 |
| 4,369,543 | 1/1983 | Chen et al. | 340/825.72 |
| 4,463,817 | 8/1984 | Mennesson | 280/87.02 W |
| 4,629,950 | 12/1986 | Ching | 180/166 |

*Primary Examiner*—John J. Love
*Assistant Examiner*—Eric Culbreth
*Attorney, Agent, or Firm*—Ernest Kettelson

[57] ABSTRACT

A safety control for a baby's walker comprising a typical baby's walker having a horizontally extending peripheral frame supported on four peripherally spaced apart legs having rollers or wheels and a seat secured to and extending downwardly from the peripheral frame for the baby to sit in, the seat having two apertures for the baby's legs to extend through and to reach the floor when the baby stands and begins to walk, moving the walker as he goes and using the walker as a support and restraint to keep from falling, the walker in accordance with this invention having a motor connected to drive one or more wheels on command to move the walker and the baby in it away from a location of danger such as a electrical outlet, the head of a stairs, an open window, a hot stove, a whirling fan and the like. A receiver to receive radio frequency or other signals from a remote transmitter and a control mechanism responsive thereto are mounted on the walker for starting, stopping and otherwise controlling operation of the motor and for steering of the walker. A remote transmitter is carried by the person watching the child to signal the control mechanism to move the walker and baby therein back and away from a location of danger when seen to be approaching such location.

11 Claims, 3 Drawing Sheets

SAFETY CONTROL FOR BABY'S WALKER

BACKGROUND OF THE INVENTION

This invention relates to the field of baby care and training devices to help a baby learn to walk and to protective mechanisms associated therewith to protect the baby from harm while using such devices.

Prior art devices include those shown and described in the following U.S. patents, some of which are in different fields, but show in a general way that remote control per se, in and of itself, is not new but known and utilized in other fields of prior art.

U.S. Pat. No. 4,629,950 discloses a baby's stroller having its rear wheels connected to a motor, and a control mechanism to automatically drive the wheels forward and in reverse repeatedly a preset distance moving the stroller back and forth to soothe the baby without the need for the baby's caretaker to do it manually.

U.S. Pat. No. 4,369,543 discloses a remote control vacuum cleaner whose wheels are driven separately by two electric motors controlled by a radio receiver and transmitter, the vacuum cleaner moving forward or in reverse when both motors are energized depending on their direction of rotation, turning to the right by energizing and operating one motor, turning to the left by energizing and operating the other motor.

U.S. Pat. No. 4,224,762 discloses a radio controlled toy car having two motors, one to drive the toy forward and the other to steer, both controlled by a radio transmitter and receiver.

U.S. Pat. No. 3,872,945 discloses a walker for a disabled adult or elderly person which has a pair of front wheels powered by an electric motor and a pair of swivel mounted rear wheels for steering the walker. This device is not remote controlled, but controlled by the person holding and using the walker.

None of these prior art devices enable a baby to move freely under his own foot power until he reaches a location of danger, or any particular place he should not be, and then counteracts against the baby's own foot power with enough strength to prevent him from actually reaching the forbidden spot and to move him back and away from such location, doing so by command received from a remote location. The baby's walker having the safety control in accordance with the preset invention does accomplish such result.

SUMMARY OF THE INVENTION

It is an object of the invention to provide a safety control for a baby's walker comprising a motor to drive one or more wheels, a control mechanism to start, stop, reverse and steer the walker and remote control circuitry and components to operate the control mechanism from a remote location, to prevent the baby and walker from reaching a location of danger and to move the baby and walker back from and away from such location.

It is an object of the invention to provide a safety control for a baby's walker whereby the baby's caretaker can safely monitor and guard the baby from danger while doing other things at a remote location away from the immediate vicinity of the baby and walker, and can from such remote location cause the walker and baby therein to be moved away from any place of danger they may be approaching.

DESCRIPTION OF PREFERRED EMBODIMENT

Figure 1:
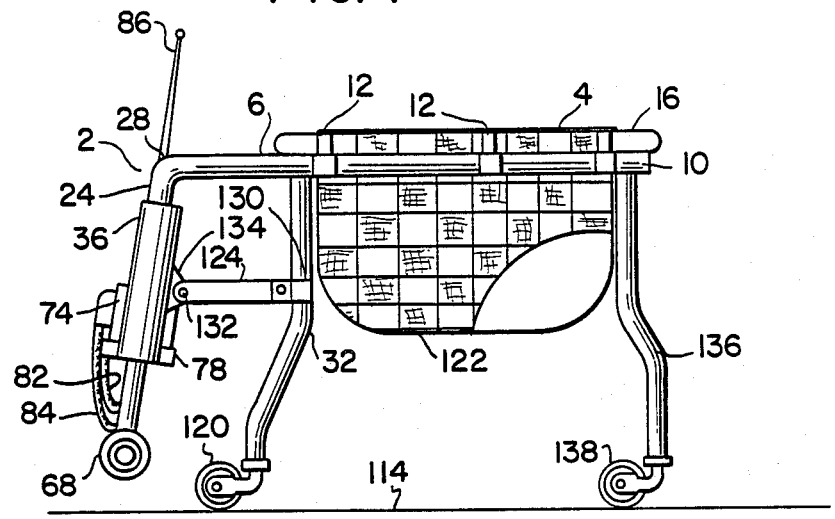
FIG. 1 is a side elevation view of a baby's walker having a safety control device in accordance with this invention mounted thereon.
Figure 2:
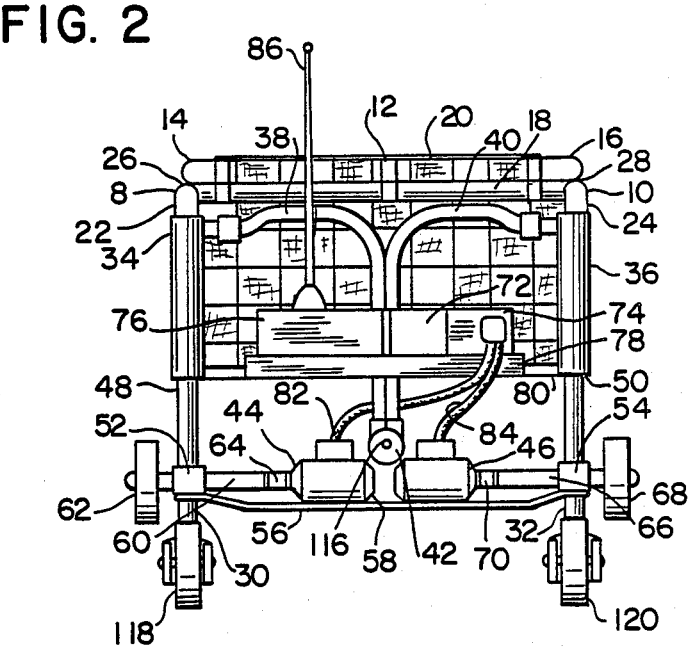
FIG. 2 is an end elevation view from the rear of the baby's walker and safety control device shown in FIG. 1.
Figure 3:
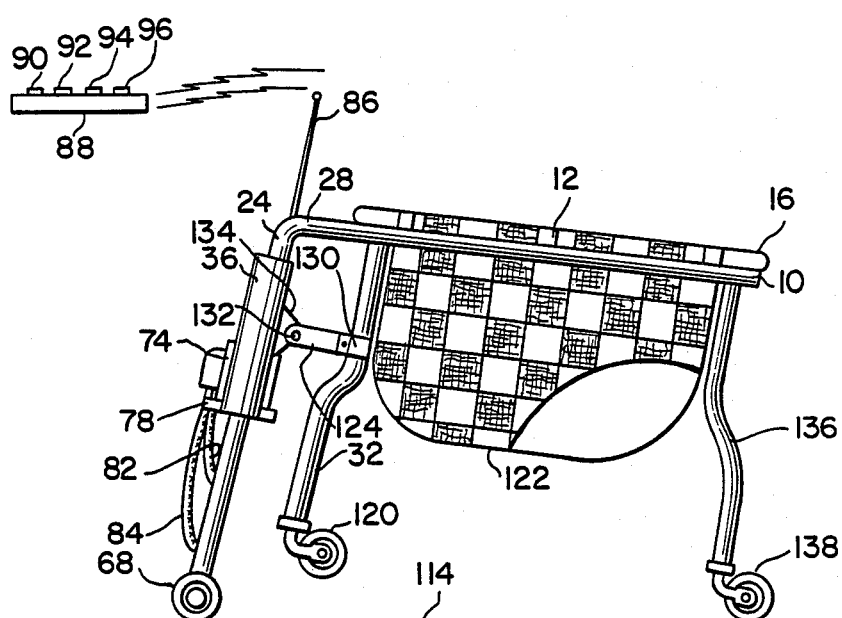
FIG. 3 is a side elevation view of the baby's walker and safety control device shown in FIG. 1 but with the motorized wheels of the safety control device lowered for operative contact with the floor surface.
Figure 4:
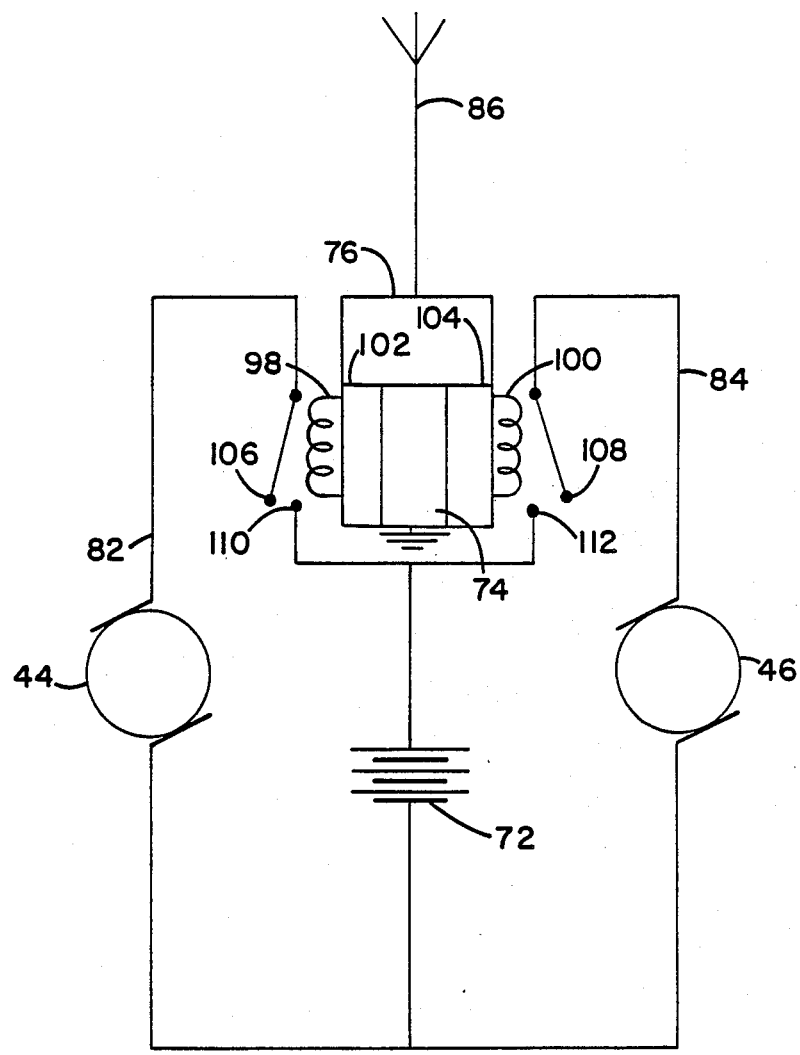
FIG. 4 is a schematic of the electrical circuit which powers and controls the dual motors to engage, drive and steer the safety control device of the baby's walker in accordance with this invention.

A safety control device 2 for a baby's walker 4 in accordance with the present invention includes a supporting frame 6 having a pair of spaced apart horizontally extending support arms 8 and 10 secured by connecting clips 12 under and adjacent to the corresponding spaced apart horizontally extending side rails 14 and 16 of the walker 4.

The supporting frame 6 includes a horizontally extending cross arm 18 extending between support arms 8 and 10, secured by connecting clips 12 under and adjacent to the corresponding back rail 20 of the walker 4.

The supporting frame 6 includes a pair of spaced apart downwardly extending legs 22 and 24 integrally joined to the rearwardly projecting end portions 26 and 28 of respective ones of the horizontally extending support arms 8 and 10, such end portions 26 and 28 extending rearwardly of the cross arm 18 and back rail 20 a sufficient distance for the operating components of downwardly extending legs 22 and 24 to clear the downwardly extending rear legs 30 and 32 of the walker 4 and to operate without obstruction.

The operating components of the downwardly extending legs 22 and 24 of the safety control device 2 include a pair of hydraulic cylinders 34 and 36 connected by hoses 38 and 40 to a double chamber hydraulic pump 42, both chambers being driven by either electric motor 44 or 46 to operate hydraulic cylinder 34 through hose 38 and hydraulic cylinder 36 through hose 40.

Each hydraulic cylinder 34 and 36 includes a reciprocating ram 48 and 50, having wheel bearings 52 and 54 at their respective free ends. A tie bar 56 extends between wheel bearings 52 and 54, and includes a mounting plate 58 centrally thereof to support the motors 44 and 46 and hydraulic pump 42.

A first independently driven axle 60 extends through wheel bearing 52 having drive wheel 62 secured to its free end on the outboard side of wheel bearing 52, and connected on the inboard side to the drive shaft 64 of electric motor 44.

A second independently driven axle 66 extends through wheel bearing 54 having drive wheel 68 secured to its free end on the outboard side of wheel bearing 54, and connected on the inboard side to the drive shaft 70 of electric motor 46.

The motors 44 and 46 are powered by a battery 72 and operated by motor control unit 74 on command from radio receiver 76. The battery 72, motor control unit 74 and radio receiver 76 are carried on a tray 78 on support bar 80 connected between the lower ends of hydraulic cylinders 34 and 36. Conductor 82 leads from motor control unit 74 to motor 44 and conductor 84 leads from motor control unit 74 to motor 46.

The radio receiver 76 includes an antenna 86 which receives command signals from remote control radio transmitter 88. The receiver 76 and transmitter 88 each have their own self contained batteries for their own operating power.

The remote control transmitter 88 for use with this invention transmits three separate signals on three different frequencies, and it includes three operating button switches 90, 92 and 94 plus a separate disconnect button switch 96. Operating button switch 90 transmits a signal to the receiver 76 having an output connected to the motor control unit 74 which energizes both coils 98 and 100 of relays 102 and 104 to attract normally open movable contacts 106 and 108 into electrical contact with stationary contacts 110 and 112 respectively. This completes or closes both motor control circuits connected to battery 72 and energizes conductors 82 and 84 to drive motors 44 and 46 in the rotational direction which causes drive wheels 62 and 68 to rotate in the direction that moves the walker 4 in reverse when they are lowered into contact with the floor 114. The motors 44 and 46 continue to operate until disconnect button switch 96 on the remote control transmitter is pressed to transmit a disconnect or shut off signal to the receiver 76. When the output from receiver 76 is discontinued, the relay coils 98 and 100 are no longer energized and movable contacts 106 and 108 which are normally biased away from stationary contacts 110 and 112 separate to interrupt the motor control circuits.

Operating button switch 92 causes the transmitter 88 to transmit a signal to the receiver 76 which delivers an output signal to the motor control unit 74 that energizes only coil 98 of relay 102 to move contact 106 into the contact closed position energizing conductor 82 and the motor control circuit which drives motor 44 and drive wheel 62 on the left hand side of the walker 4. When wheel 62 is in contact with the floor, the powered rotation of drive wheel 62 on the left side of the walker 4 while drive wheel 68 on the right hand side is not powered steers the walker to the right.

Operating button switch 94 causes the transmitter 88 to transmit a signal to the receiver 76 which delivers an output signal to the motor control unit 74 that energizes only coil 100 of relay 104 to move contact 108 into the contact closed position energizing conductor 84 and the motor control circuit which drives motor 46 and drive wheel 68 on the right hand side of the walker 4. When wheel 68 is in contact with the floor, the powered rotation of drive wheel 68 on the right hand side of the walker 4 while drive wheel 62 on the left hand side is not powered steers the walker to the left.

Either motor 44 or 46 or both together operate the hydraulic pump 42 to in turn operate both hydraulic cylinders 34 and 36. When pump control 116 is in the extend position and pump 42 is operated, the rams 48 and 50 are moved to their extended position lowering drive wheels 62 and 68 into driving contact with the floor and at the same time raising the rear wheels 118 and 120 of the walker 4 from the floor. The seat 122 of the walker 4 is also raised thereby raising the baby sitting in the walker enough so that his legs no longer touch the floor, or do not have sufficient contact with the floor for the baby to continue to propel the walker forward. While drive wheels 62 and 68 are being lowered by action of the hydraulic cylinders powered by motor 44 or 46 or by both of them, at least one drive wheel also begins to rotate powered by either motor 44 or 46 or both of them, depending on the choice selected by the person operating the remote control transmitter 88 by depressing either operating button switch 90, which causes both motors 44 and 46 and both drive wheels 62 and 68 to rotate, 92 which causes motor 44 and left hand drive wheel 62 to rotate, or 94 which causes motor 46 and right hand drive wheel 68 to rotate. Thus, as soon as drive wheels 62 and 68 touch the floor, the already rotating wheel or wheels moves the walker 4 rearwardly either in a straight line if both drive wheels are rotating, to the right if only drive wheel 62 is being driven by motor 44 or to the left if only drive wheel 68 is being driven by motor 46.

When pump control 116 is turned to the retract position and pump 42 is operated by one or both of the motors 44 and 46, the rams 48 and 50 are retracted into the hydraulic cylinders 34 and 36, thereby lifting driove wheels 62 and 68 out of contact with the floor and allowing the rear wheels 118 and 120 to the walker 4 to lower back down to the floor.

The hydraulic cylinders 34 and 36 and rams 48 and 50 are selected to be long enough, and to extend far enough, to lift rear wheels 118 and 120 of the walker 4 from the floor when rams 48 and 50 are fully extended and drive wheels 62 and 68 of the safety control device 2 in accordance with this invention are in driving contact with the floor, and to lift the seat 122 of walker 4 enough so the legs of a baby sitting therein are also lifted from the floor. This construction has the advantage of putting the full weight of the baby in the walker 4 on the drive wheels 62 and 68 of the safety control device 2 for better traction and more certain movement of the walker 4 back and away from a location of danger while at the same time preventing the baby from pushing the walker 4 toward such location of danger since his legs are lifted from the floor.

The operation of radio receivers and transmitters is well known and need not be explained in detail here. Briefly, the antenna which picks up the radio waves from the transmitter is coupled to the input of an RF amplifier in the receiver. The output of the RF amplifier is applied to an electronic component called a mixer which is also connected to an oscillator. The mixer then "mixes" the RF signal from the RF amplifier with the oscillating signal from the oscillator to produce an output signal of a lower intermediate frequency. This lower intermediate frequency signal is then fed to an intermediate frequency amplifier, and that amplified signal is then applied to an electronic component known as a discriminator which in turn produces an output voltage that is then fed to a relay, such as relay 102 or 104, or both of them, depending on the RF signal or signals transmitted by the remote control transmitter 88, to energize such relay coil. The motor control circuits then function as described above in response to whatever signals are transmitted by the transmitter 88 to the receiver 76.

A stabilizing bar 124 is provided to secure the hydraulic cylinders 34 and 36 to a midpoint region of the rear legs 30 and 32 of the walker 4, secured at one end to legs 30 and 32 by mounting brackets 130 and at the other end to hydraulic cylinders 34 and 36 by pins 132 through apertures of mounting projections 134.

The safety control device 2 may be mounted in front of the walker, in which case the motors 44 and 46 are mounted to rotate drive wheels 62 and 68 in the opposite direction to push the walker 4 back and away from a location of danger, and in such case the front legs 136 and front wheels 138 of the walker 4 are lifted from the floor when the rams 48 and 50 are fully extended.

The safety control device 2 in accordance with this invention may be readily mounted on any already existing baby's walker having horizontally extending upper side rails to which the support arms 8 and 10 of the safety control device 2 can be attached by clips 12 or other conventional connecting devices.

Other means may be used to raise and lower the drive wheels 62 and 68 of the safety control device than the hydraulic cylinders shown and described herein, including pneumatic cylinders and rams, spring loaded extension rods and a trigger release relay mechanism operated by a remote control transmitter and receiver with the extension rods being retracted and reset manually against the spring bias, and various other lifting and lowering mechanisms. Other means may also be used to steer the walker to the right or left, and it is within the scope of this invention to use drive wheels which do not steer the walker at all but merely move it in a straight line back from a location of potential danger. The drive wheels 62 and 68 provide traction with the floor or ground when placed in contact therewith to move the walker when the drive wheels 62 and 68 are rotated as described hereinabove.

I claim:

1. A safety control device and baby's walker combination wherein said baby's walker includes a pair of spaced apart horizontally extending side rails supported on a plurality of peripherally spaced apart legs depending downwardly therefrom having rollers or wheels to support said walker for rolling movement when in use by a baby and a seat supported between said side rails, said safety control device including connecting means to connect said safety control device to said walker, shiftable traction means shiftable between an engaged position engaging the surface on which said walker is being used and a disengaged position above said surface and being operable to move said walker when in said engaged position in at least one direction away from a particular location, said traction means being inoperable to move said walker and inoperable to restrain movement of said walker when in said disengaged position, power means to operate said traction means for movement of said walker when said traction means is in said engaged position, and control means to direct said power means to begin operating said traction means for said movement of said walker and to discontinue operating said traction means thereby discontinuing such movement of said walker.

2. A safety control device and baby's walker combination as set forth in claim 1, wherein said connecting means includes a frame and connectors to connect a portion of said frame to said side rails of said walker, said traction means includes a rotatable drive member mounted for rotation on a portion of said frame, and said power means includes a motor connected to rotate said rotatable drive member.

3. A safety control device and baby's walker combination as set forth in claim 1, wherein said control means includes a radio receiver carried by said walker, a portable radio transmitter remote from said walker to transmit signals to said reciever, and operating means to receive outputs from said receiver and direct operation of said power means responsive thereto.

4. A safety control device and baby's walker combination as set forth in claim 3, wherein said power means includes an electric motor, said operating means includes at least one relay having a coil energized by a selective output from said receiver, a movable contact responsive to said coil to make contact with a stationary contact upon energization of said coil, an electrical circuit including said stationary contact connected to operate said electric motor, and a power source connected to energize said electrical circuit when said movable contact makes contact with said stationary contact.

5. A safety control device and baby's walker combination wherein said baby's walker includes a pair of spaced apart horizontally extending side rails supported on a plurality of peripherally spaced apart legs depending downwardly therefrom having rollers or wheels and a seat supported between said side rails extending downwardly therefrom, said safety control device including connecting means to connect said safety control device to said walker, shiftable traction means shiftable between an engaged and disengaged position for driving contact with the surface on which said walker is being used when in said engaged position to move said walker in at least one direction away from a particular location, said traction means being out of said driving contact when in said disengaged position, power means to operate said traction means, control means to direct said power means to begin operating said traction means for said movement of said walker and to discontinue operating said traction means thereby discontinuing such movement of said walker, including engage and disengage means to move said traction means into driving contact with said surface on which said walker is being used and out of driving contact therewith.

6. A safety control device and baby's walker combination as set forth in claim 5, wherein said traction means includes a pair of spaced apart rotatable drive memebers positioned adjacent at least one of said rollers or wheels of said walker, said engage and disengage means includes a lift member on said safety control device operable between a raised and lowered position and connected to raise and lower said pair of spaced apart rotatable drive members relative to said adjacent one of said rollers or wheels of said walker, said pair of spaced apart rotatable drive members being at a level above said adjacent one of said rollers or wheels of said walker in the direction upwardly therefrom toward said side rails of said walker when said lift member is moved to its said raised position, said pair of spaced apart rotatable drive members being at a level below said adjacent one of said rollers or wheels of said walker when said lift member is moved to its said lowered position whereby when said pair of spaced apart rotatable drive members are in driving contact with the side surface on which said walker is being used and in said lowered position the said adjacent one of said rollers or wheels of said walker is lifted from said surface.

7. A safety control device and baby's walker combination as set forth in claim 2, wherein said traction means includes a pair of spaced apart rotatable drive members, said engage and disengage means include at least one pressure responsive device having a ram reciprocally movable relative thereto between a retracted and an extended position, said pressure responsive device being affixed to said walker, said ram having an outwardly extending end connected to move said pair of spaced apart rotatable drive members into driving contact with said surface on which said walker is being used when said ram is in its said extended position and out of driving contact therewith when said ram is moved to its said retracted position, and a pressure source to move said ram under pressure from at least its retracted position to its said extended position.

8. A safety control device and baby's walker combination as set forth in claim 7, wherein said pressure responsive device is a hydraulic cylinder and said pressure source is a hydraulic pump.

9. A safety control device and baby's walker combination, wherein said baby's walker includes a pair of spaced apart horizontally extending side rails supported on a plurality of peripherally spaced apart legs depending downwardly therefrom having rollers or wheels and a seat supported between said side rails extending downwardly therefrom, said safety control device including connecting means to connect said safety control device to said walker, shiftable traction means shiftable between an engaged and disengaged position for driving contact with the surface on which said walker is being used when in said engaged position to move said walker in at least one direction away from a particular location, said traction means being out of said driving contact when in said disengaged position, power means to operate said traction means, control means to direct said power means to begin operating said traction means for said movement of said walker and to discontinue operating said traction means thereby discontinuing such movement of said walker, wherein said connecting means includes a frame and connectors to connect a portion of said frame to said side rails of said walker, said traction means includes a first rotatable drive member mounted for rotation on a portion of said frame, a second rotatable drive member mounted for rotation on a portion of said frame and spaced apart from said first rotatable drive member, said power means includes a first motor connected to rotate said first rotatable drive member independently of said second rotatable drive member, a second motor connected to rotate said second rotatable drive member independently or said first rotatable drive member whereby when said first motor rotates said first rotatable drive member while said second motor is not operating to drive said second rotatable drive member said walker is steered in one direction, when said second motor rotates said second rotatable drive member while said first motor is not operating to drive said first rotatable drive member said walker is steered in a second direction, and when both of said motors rotate both of said rotatable drive members simultaneously said walker is moved in a straight line, including a first pressure responsive device having a first ram reciprocally movable relative thereto between a retracted and an extended position, said first pressure responsive device being affixed to said walker at a first location, said first ram having an outwardly extending end connected to move said first rotatable drive member into driving contact with said surface on which said walker is being used when said first ram is in its said extended position and out of driving contact therewith when said first ram is moved to its said retracted position, a second pressure responsive device having a second ram reciprocally movable relative thereto between a retracted and an extended position, said second pressure responsive device being affixed to said walker at a second location spaced apart from said first location, said second ram having an outwardly extending end connected to move said second rotatable drive member into driving contact with said surface on which said walker is being used when said second ram is in its said extended position and out of driving contact therewith when said second ram is moved to its said retracted position, and at least one pressure source to move said first and second rams under pressure from at least their retracted position to their said extended position.

10. A safety control device and baby's walker combination as set forth in claim 9, wherein said first and second pressure responsive devices are hydraulic cylinders and said pressure source is a hydraulic pump.

11. A safety control device and baby's walker combination as set forth in claim 9, wherein said control means includes a radio receiver carried by said walker, a portable radio transmitter remote from said walker to transmit signals to said receiver, a first relay having a first coil energized by a selective output from said receiver, a first movable contact responsive to said first coil to make contact with a first corresponding contact upon energization of said first coil, a first electrical circuit including said first corresponding contact connected to operate said first motor, a second relay having a second coil energized by a selective output from said receiver, a second movable contact responsive to said second coil to make contact with a second corresponding contact upon energization of said second coil, a second electrical circuit including said second corresponding contact connected to operate said second motor, a power source connected to energize said first electrical circuit when said first movable contact makes contact with said first corresponding contact and to energize said second electrical circuit when said second movable contact makes contact with said second corresponding contact.

* * * * *